No. 688,575. Patented Dec. 10, 1901.
H. BAGGETT.
ELECTRIC ARC LAMP.
(Application filed Sept. 13, 1899.)
(No Model.) 3 Sheets—Sheet 1.
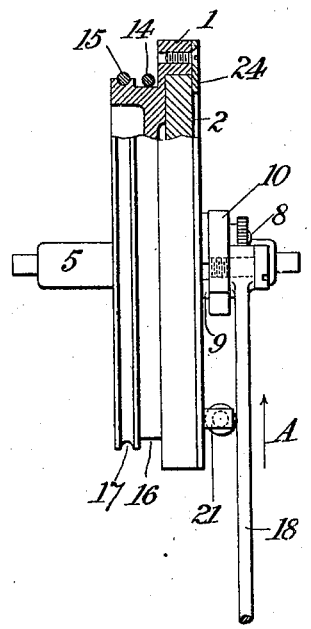
Fig. 1.
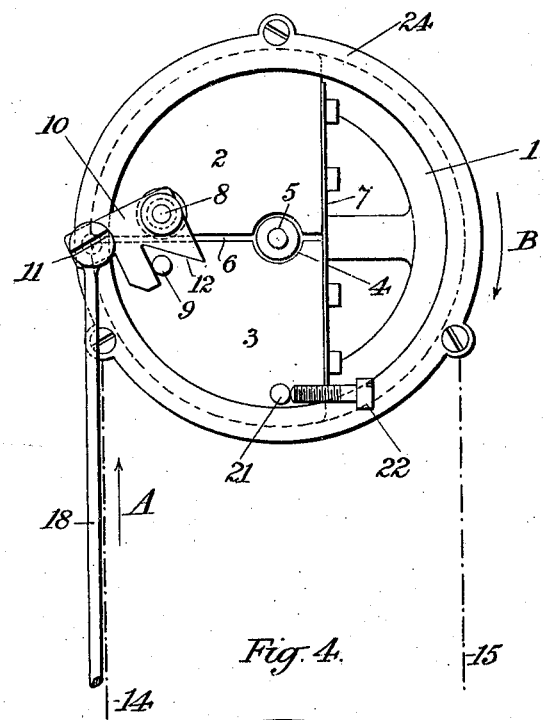
Fig. 2.
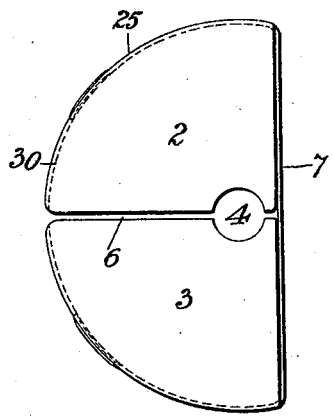
Fig. 3.
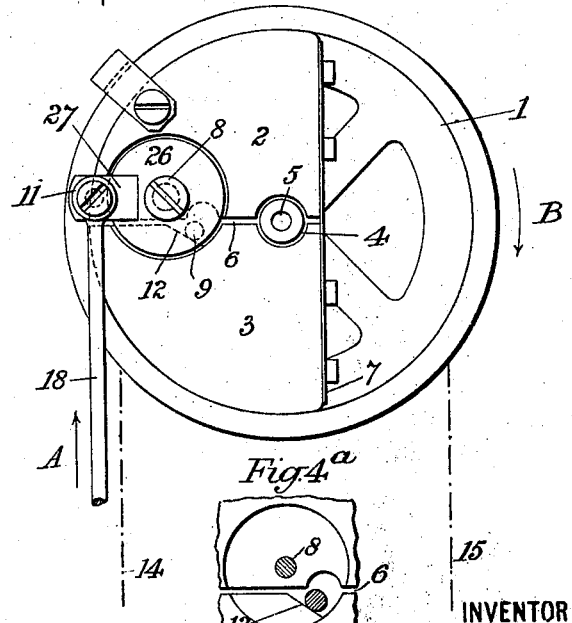
Fig. 4.
Fig. 4a.
WITNESSES:
INVENTOR
Henry Baggett,
BY
ATTORNEYS.
THE NORRIS PETERS CO., PHOTO-LITHO., WASHINGTON, D. C.

No. 688,575. Patented Dec. 10, 1901.
H. BAGGETT.
ELECTRIC ARC LAMP.
(Application filed Sept. 13, 1899.)
(No Model.) 3 Sheets—Sheet 2.
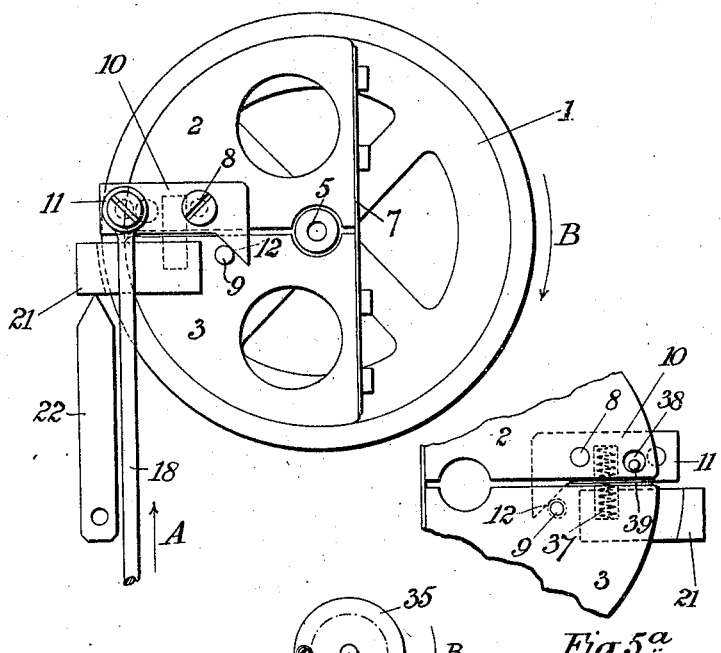
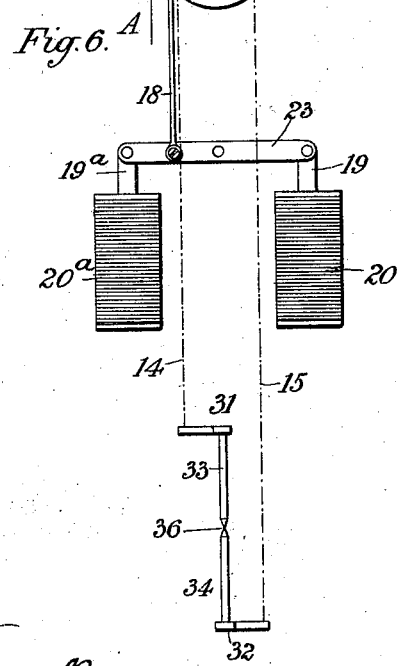
WITNESSES:
INVENTOR:
Henry Baggett,
BY
ATTORNEYS.

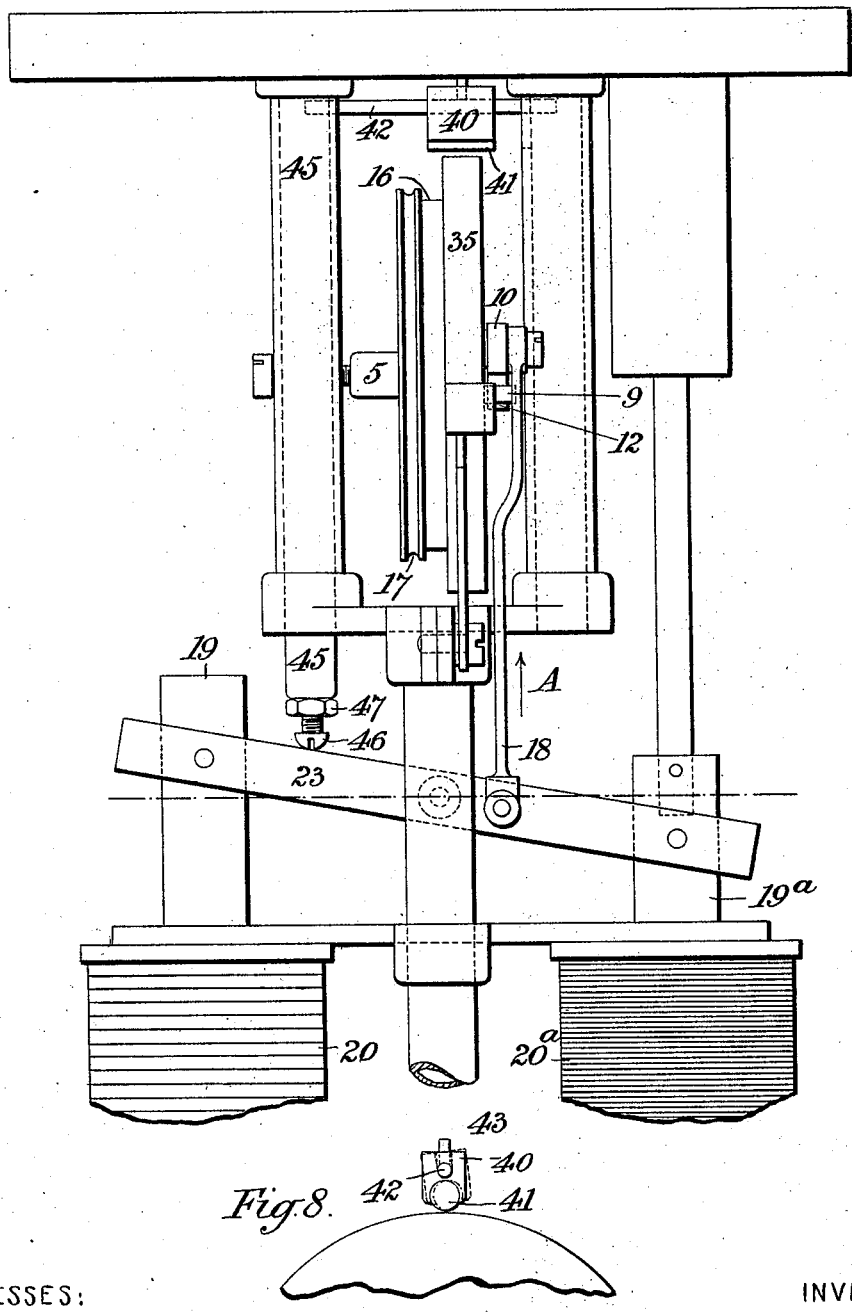

UNITED STATES PATENT OFFICE.

HENRY BAGGETT, OF BLACKHEATH, ENGLAND.

ELECTRIC-ARC LAMP.

SPECIFICATION forming part of Letters Patent No. 688,575, dated December 10, 1901.

Application filed September 13, 1899. Serial No. 730,292. (No model.)

*To all whom it may concern:*

Be it known that I, HENRY BAGGETT, a subject of the Queen of Great Britain, and a resident of Blackheath, in the county of Kent, England, have invented certain new and useful Improvements in Electric-Arc Lamps, of which the following is a specification.

This invention relates to that type of electric-arc lamp in which the carbons are moved by two cords or strings wound around a common pulley in such a way that when the pulley rotates in one direction the carbons are separated and when the pulley is rotated in the other direction the carbons are brought toward one another. In such arc-lamps the movement of the pulley in the direction tending to separate the carbons is commonly produced by the action of a solenoid whose core is geared or linked to the pulley, so that when the current in the said solenoid is too strong the pulley is turned around and the carbons are separated and when the current is too small the carbons are allowed to close up, their motion being controlled by some form of brake. In such arc-lamps the brake hereinbefore mentioned is liable to convey shock to the carbons as they come together, and many devices have been designed with a view to overcoming this objection. This invention has for its object principally to provide a very delicate and sensitive brake for arc-lamps of this class and also an improved means of causing and regulating the movement of the pulley. In addition to the brake I sometimes apply a loose drag on the periphery of the pulley, so arranged that the contact-surfaces are respectively of rubber or other similar material and metal.

In order that my invention may be more readily understood, I append drawings hereto, illustrating one form of my invention and certain modifications thereof.

Figure 1 is an edge view, partly in section, of a pulley constructed in accordance with my invention. Fig. 2 is a side elevation of the same. Fig. 3 is a detail view of the two segments hereinafter to be described. Figs. 4 and 4ª illustrate a modified form of the parts shown in Figs. 1 and 2. Figs. 5 and 5ª are further modifications. Fig. 6 is a diagrammatic view illustrating how a brake-pulley constructed in accordance with my invention may be connected with an arc-lamp's solenoids and with the upper and lower carbon holders. Fig. 7 is a view of a portion of an arc-lamp fitted with a brake-pulley and a drag in which edge views of the pulley and drag are shown. Fig. 8 is a detail side view of the pulley and drag.

In carrying out my invention I provide a recess 1 in the pulley concentric with the said pulley and of an internal diameter slightly smaller than the diameter of the pulley itself, within which I place two segments 2 and 3, which may be made as hereinafter described. I take a disk whose thickness is slightly less than the depth of the recess in the pulley and which is provided with an aperture 4 at its center large enough to allow the spindle 5 of the pulley to pass through without touching the disk. I make the diameter of the disk of such a size that the disk will exactly fit into the recess and turn freely therein without touching the spindle. I now cut the disk along two lines, one line being a diameter and the other line being a chord at right angles to the said diameter and whose length is slightly less than that of a diameter. Of the four segments into which the disk is now divided I make use for the purpose of my invention of the two larger segments 2 and 3, each being slightly larger than a quadrant of the original disk. It will be seen that when these two segments are placed in the recess in the pulley in the same relative positions which they occupy in the original disk they will take up a little more than half the space in the recess and that there will be a clearance between the said segments and the spindle and a small space 6 between the adjacent sides of the two segments equal in amount to the width of the cut. I provide a thin metallic strip 7—such, for instance, as a straight steel blade-spring—of length slightly less than the aforesaid chord, and I fasten this in a suitable manner to those sides of the segments constituting the said chord. The said strip keeps the segments in place, so that they may now be turned around inside the recess without changing their relative position. It will now be seen that any action tending to separate the adjacent faces of the segments will have the effect of jamming the segments against the sides of the recess. I fix a lever 10 on one of the segments, acting in such a way that when pressed in a certain direction it tends to separate the adjacent faces of the segments. This may be done in any convenient manner. One way of doing so which gives good results is to fix two pins 8 and 9, Figs. 1 and 2, one in each segment at right angles to the surfaces of the said segments. The lever 10 may be pivoted onto one, 8, of the said pins and shaped in such a way that when one end 11 of it is moved upward the inclined face 12 of the other end bears against the second pin 9, so as to force the segments apart. It will now be seen that if the lever is moved in the direction of the arrow A the segments 2 and 3 will separate and jam in the recess, and continued movement on the lever will turn the pulley in the direction of arrow B. If, however, the lever is moved in the contrary direction, the segments will move inside the recess, and the pulley will be free to rotate independently of the segments. I place the pulley, with the segments and the parts attached thereto, so that its plane of rotation is vertical, and I wind around the pulley two cords 14 and 15, placed in suitable grooves 16 and 17. One end of each cord is fastened to the rim of the pulley, and the other end of each cord supports one of the carbon-holders 31 and 32, (see Fig. 6,) so that when the pulley is turned in a clockwise direction the carbons 33 and 34 are separated, and when it is turned in a contra-clockwise direction the carbons are brought together. I may connect the aforesaid lever by a link 18 to the core 19 of the solenoid 20, through which latter passes the current to the carbons, so that when the core 19 is drawn into the solenoid 20 the lever 10 is moved in a direction tending to jam the segments 2 and 3 in the recess, and thereby to move the pulley 35 in a direction that separates the carbons. By this means I provide a convenient method of striking the arc 36 and keeping it at its proper length. I provide one of the segments with the stud 21, projecting from the surface of the said segment and adapted to engage with a set-screw 22, fixed on the main frame of the lamp in such a way that the set-screw stops the rotation of the segments in one direction, the said segments being free to rotate in a direction away from the said set-screw.

I adjust the weights of the carbon-holders so that the two carbons tend to come together when they are not held. It will then be seen that, supposing the carbons to have been separated by any given distance, they will move toward one another, during which time the friction of the inside surface of the recess against the segments will tend to force the segments around and bring the aforesaid stud 21 into contact with the set-screw 22.

I shall now describe how my invention works in practice. When the current is switched onto the lamp, the core 19 is sucked into the solenoid 20 and presses on the lever 10 through the medium of the bar 23 and link 18. The segments 2 and 3 are jammed in the recess 1, and the pulley is turned around a short distance, thereby striking the arc. The strength of the current is thus diminished and the pressure on the lever 10 relieved by the stud 21 coming in contact with the set-screw 22. The weight of the carbon-holders then turns the pulley, which is now not held by the lever 10, and the carbons gradually feed together. This process goes on while the carbons burn away. When the carbons come too near one another, the current will increase, the core of the solenoid will move the link 18 against the lever 10, and the segments will become jammed, thereby stopping the feeding action of the pulley. When the carbons have burned away so that the current is again of normal strength, the pressure on the segments is released and the pulley is free to rotate. I may keep the segments in position by any suitable means—as, for instance, by a retaining-ring 24, attached to the pulley, for example, by screws. The shape of the segments may be modified so long as their essential features, hereinbefore described, are maintained. Thus, for instance, it may be convenient to lighten them by perforations or apertures. In some cases I make the blade-spring 7, which serves to keep the segments in place, of such a length that instead of terminating as hereinbefore described it may be made to embrace one or both of the segments, passing around the circular faces thereof and doubling in, as at 25, Fig. 3, so as to grip closely the whole or part of the periphery of the said segments. The said spring 7, with its arc-shaped prolongations 25, in such cases could be made in one continuous piece, and a groove 30 would be provided around the periphery of the segments, so that the pressure of the spring does not interfere with the fit of the segments in the recess.

In Figs. 4 and 4ª the lever 10 consists of a disk 26, with a projection or lug 27 on its face. The two segments are recessed at 28 and 29 to receive the disk portions of the lever, and the segments are cut away below the recess at 12 to form a face corresponding to the face 12 on the lever 10, Fig. 2. The lever 10 is pivoted to the segment 2 at 8; but instead of the segment 3, Fig. 2, carrying the stud 9 it is fixed to the lever and bears against the face 12, which the segment has been cut away to form.

In Figs. 5 and 5ª the lever 10, similar to that shown in Figs. 1 and 2, carries a pin 39 on its under surface, which projects into a hole or slot 38 in the segment 2. This pin is normally not in contact with the sides of the hole or slot. When the pressure on the lever 10 is relieved, should the segments for any reason stick the pull of the solenoid 19ª, through the connecting-bar 23 and link 18, draws the end 11 of the lever down and brings the pin 39 in contact with the bottom of the slot 38 in the segment 2 and draws the segments together and releases the pulley.

In Figs. 5 and 5ª, in lieu of the stud 21 and the set-screw 22, I attach a stop 21 to the segment 3 and fit a stop-piece 22, adjustable by a slot, on the main frame of the lamp. I also show in Figs. 5 and 5ª a spiral spring 37, fitted in recesses in the adjacent sides of the segments and tending to keep them apart and pressed slightly against the pulley, though not sufficiently so to act as a drag.

Figs. 7 and 8 show one way, in accordance with my invention, in which I apply a drag to the outer periphery of the pulley. This drag consists of a block 40, faced with a piece of rubber 41, bearing on the outer periphery of the pulley. The block is secured to the shaft 42 by a pin 43 passing through a hole in the said block of slightly greater diameter than the pin, so as to allow an angular movement, but not of any material longitudinal movement on the shaft. The shaft 42 and drag are borne by a vertical rod 45, arranged to slide in the frame of the lamp, and the lower end of the rod is provided with means for the adjustment of its length—for example, by a set-screw 46 and lock-nut 47. The drag is held clear of the pulley by the action of the lamp-solenoids, which operate through the connecting-bar 23 on the lower end of the rod 45, as shown in Fig. 7. When the bar 23 is drawn away from the rod 45, the drag falls by gravity, so as to come in contact with the periphery of the pulley.

It will readily be seen on referring to the drawings that when the core 19 is drawn in by the solenoid 20 the bar 23 is moved away from the lower end of the rod 45 and that the drag will fall by gravity and come in contact with the pulley 35, so that it rests on the pulley during the formation of the arc. The angular movement of the block prevents the drag impeding the striking of the arc, and after the arc is formed the drag acts on the pulley during the feeding of the carbons. I find the drag useful in practice, but not necessary.

Having now described my invention, what I claim, and desire to secure by Letters Patent, is—

1. An electric-arc lamp having carbon-feeding mechanism provided with a pulley, a drag device provided with a vertically-movable gravity-support adapted to be raised and lowered by a movement of the carbon-feeding mechanism so as to lower the drag device against the periphery of said pulley and to raise it therefrom, substantially as and for the purpose set forth.

2. An electric-arc lamp having carbon-feeding mechanism provided with a pulley, a concentric annular part moving in fixed relation with the pulley and constituting a surface against which the brake is applied, a pair of brake members located within said annular part and adapted to move away from and toward each other to brake and release said part, a lever connected with and controlled by the core of the solenoid and adapted when moved in one direction to force said brake members apart to apply the brake, and also adapted to move said brake members relatively toward each other in the reverse movement of the lever to prevent such members from sticking, substantially as and for the purpose set forth.

3. An electric-arc lamp having carbon-feeding mechanism provided with a pulley, a concentric annular part moving in fixed relation with the pulley and constituting a surface against which the brake is applied, a pair of brake members located within said annular part and adapted to move away from and toward each other to brake and release said part, a spring normally holding said brake members apart but not so as to apply the brakes, a lever pivoted to one of said brake members and engaging with the other said member when moved in one direction to force the two members apart and apply the brake, a slot formed in the brake member to which said lever is pivoted and a pin projecting from said lever into said slot and adapted to engage one edge of the slot when the lever is moved in the reverse direction to release the brake and to thereby move said member toward the other to prevent the same from sticking on said annular part, substantially as and for the purpose set forth.

4. An electric-arc lamp having carbon-feeding mechanism provided with a pulley B having a concentric annular part 1 fixed thereto, a pair of brake-segments 2 and 3 provided with a spring 7 for normally holding them apart, a lever 10 pivoted to one of said brake-segments and having an edge 12 engaging a fixed piece upon the other segment, a link 18 pivoted to said lever and connected with and actuated by the core 5, substantially as and for the purpose set forth.

5. An electric-arc lamp having carbon-feeding mechanism provided with a pulley, a pair of brake members adapted to move away from and toward each other to brake and release said pulley, connections between said brake members and the core of the solenoid for operating said brake members to apply and release them, and a spring arranged between the two brake members for gradually pressing the same apart and also to prevent the two brake members from being brought suddenly together, substantially as and for the purpose set forth.

6. An electric-arc lamp having carbon-feeding mechanism provided with a pulley, a fixed part secured to said pulley and constituting a surface against which the brake members are applied, a pair of brake members 2 and 3, respectively, adapted to move away from and toward each other to brake and release said part, a spring normally holding said brake members apart, but not so as to apply the same, a fixed pin 9 mounted upon one of said brake members, a lever 10 pivoted upon the other said brake member and adapted to engage with the fixed pin 9 when the lever is moved in one direction to force the brake members apart, a slot 38 formed in the brake member to which said lever is pivoted, and a fixed pin 39 projecting from said lever into the slot 38 and adapted to engage one edge of the slot when the lever is moved in the direction to bring the brake members together to prevent such members from sticking on the braking-surface, and connections between said lever and the core of the solenoid, substantially as and for the purpose set forth.

7. An electric-arc lamp having carbon-feeding mechanism provided with a pulley, an annular part fixed to said pulley concentrically therewith, and constituting a surface against which the brake is applied, two segments lying within the said annular part so as to engage the same with their peripheries when moved away from each other, a spring secured to an edge of each of the segments and normally holding the opposing faces of the segments away from each other, and a lever for moving the two segments toward and away from each other to cause them to disengage or engage the annular part, said lever being connected with and controlled by the core of the solenoid of the feed-regulating mechanism, substantially as and for the purpose set forth.

8. An electric-arc lamp having carbon-feeding mechanism provided with a pulley, a drag device consisting in a pivoted member adapted to rock in the plane of the pulley and engage the periphery thereof, the contact-face of said member being provided with frictional material such as rubber, substantially as and for the purpose set forth.

9. An electric-arc lamp having carbon-feeding mechanism provided with a pulley, a drag device consisting in a pivoted member adapted to rock in the plane of the pulley and engage the periphery thereof, the contact-face of said member being provided with frictional material such as rubber, and an adjustable carrier for said drag device actuated by a carbon-feed-regulating mechanism, so as to move the drag device into and out of contact with the said pulley, substantially as and for the purpose set forth.

In witness whereof I have hereunto set my hand in presence of two witnesses.

HENRY BAGGETT.

Witnesses:
FRED C. HARRIS,
T. J. OSMAN.